Nov. 4, 1941.     H. R. LONGFELLOW     2,261,772
APPARATUS FOR MEASURING ARTICLES
Filed Jan. 11, 1940
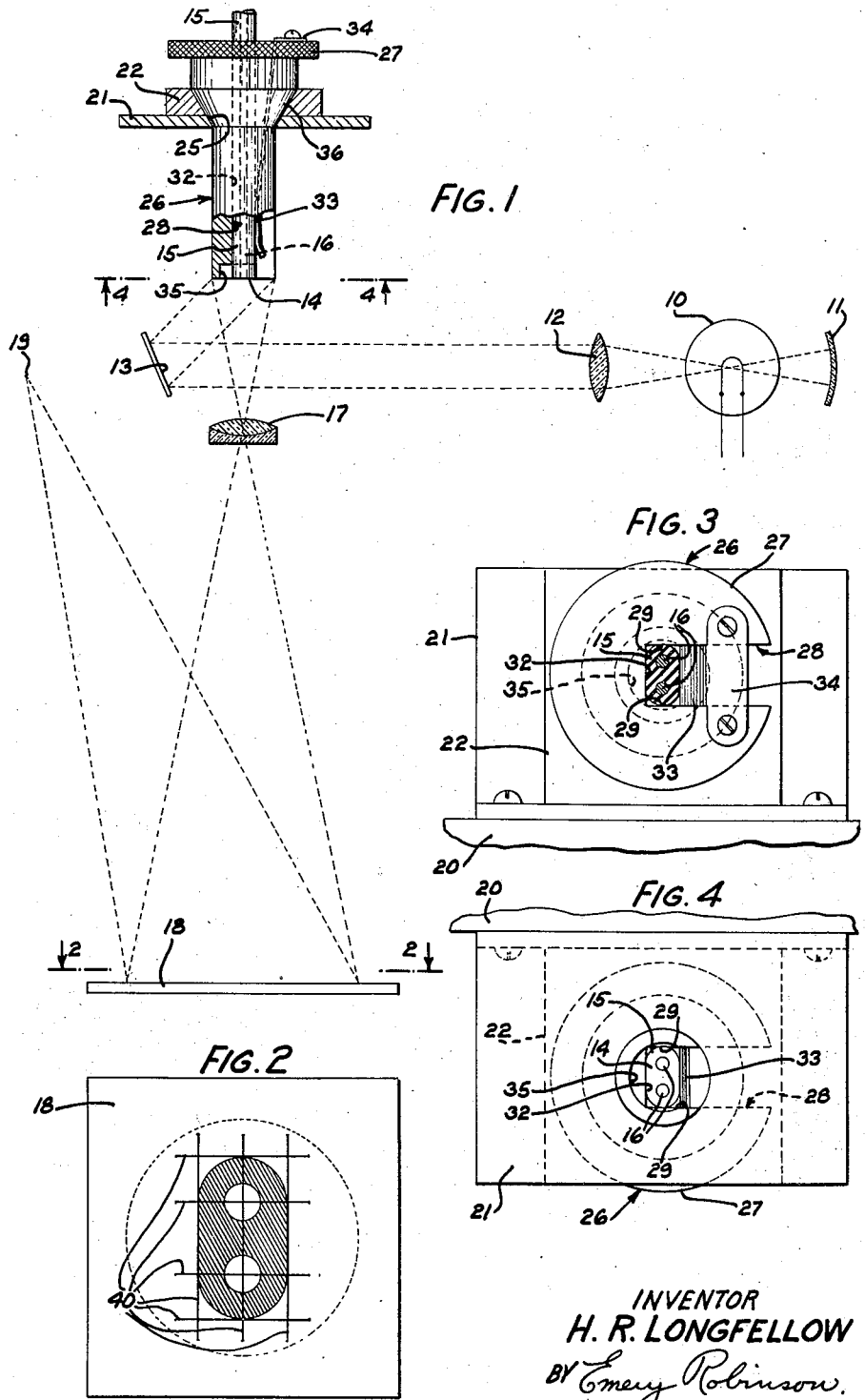
INVENTOR
H. R. LONGFELLOW
BY Emery Robinson
ATTORNEY Patented Nov. 4, 1941

2,261,772

UNITED STATES PATENT OFFICE 2,261,772

APPARATUS FOR MEASURING ARTICLES

Harold R. Longfellow, Baltimore, Md., assignor to Western Electric Company, Incorporated, New York, N. Y., a corporation of New York Application January 11, 1940, Serial No. 313,340

4 Claims. (Cl. 88—24)

This invention relates to an apparatus for measuring articles, and more particularly to an apparatus involving optical systems for measuring cross-sectional areas of articles.

One use to which this invention has been applied and found particularly advantageous is that of measuring the overall dimensions, diameter and concentricity of easily compressible rubber covered electrical conductors, specifically rubber covered multi-electrical conductors of the oval cross-sectional type. Heretofore, the usual method of measuring the various dimensions of such conductors has been to visually examine cross-sectional areas of the conductors and in addition to manually use a micrometer on the conductors. Difficulty has been experienced in obtaining a satisfactory determination of the various cross-sectional dimensions and contour of such conductors by this prior method since the results obtained thereby generally depend on the keen observation of the person inspecting the area and a skillful manual manipulation of the micrometer upon the easily compressible rubber surrounding the conductors.

An object of the invention is to provide an improved apparatus for accurately and expeditiously measuring articles.

In attaining this and other objects, the method as practiced for measuring dimensions of articles, such as overall dimensions, diameter and concentricity of easily compressible rubber covered multi-electrical conductors of the oval cross-sectional type, comprises cutting a sample length of conductor, forming an undistorted cross-sectional area by grinding or other finishing operations beyond the point at which it was cut, predeterminedly positioning the area in an optical projection system producing a beam of light and then projecting an enlarged image of the area on a scale screen for comparison therewith. An apparatus embodying the features of the invention for practicing the method includes a rotatable sleevelike member and an apertured adjustable support for freely receiving and predeterminedly positioning the member for rotation in the system. The member is provided with a slot extending longitudinally throughout its length for receiving the sample length of conductor, the cross-sectional area being positioned flush with an end surface of the member, and a yieldable element carried by the member arranged to engage a portion of the conductor adjacent the cross-sectional area for retaining the conductor in a predetermined position within the slot.

Other objects and advantages of the invention will be understood by referring to the following specification and accompanying drawing, in which Fig. 1 is a diagrammatic side view of an optical projection system and means, shown partly in section, for supporting a sample length of conductor to be measured embodying the features of this invention as applied to the measuring of cross-sectional areas of rubber covered multi-electrical conductors of the oval type;

Fig. 2 is a plan view taken on the line 2—2 of Fig. 1 showing the scale screen and the magnified image of the cross-sectional area of the conductor being measured;

Fig. 3 is an enlarged plan view, as viewed in Fig. 1, of the means for supporting the length of conductor with its cross-sectional area to be measured in predetermined position in the optical projection system, and Fig. 4 is an enlarged fragmentary bottom plan view taken on the line 4—4 of Fig. 1.

In the drawing referring particularly to Fig. 1 which diagrammatically illustrates an optical projection system, a lamp 10 emits a beam of light of high intensity. The light beam passes from a housing (not shown) which supports a reflector 11 through a condensing lens 12 and to a mirror 13 which deflects the light beam upwardly at a suitable angle to illuminate an end cross-sectional area 14 of an article to be measured, which in the present instance is a sample length of rubber covered multi-electrical conductor 15 of the oval cross-sectional type, conducting wires being indicated at 16. From the highly illuminated conductor area 14 the light beam is reflected through a system of projection lenses indicated at 17 of a suitable telescope or microscope which projects a magnified image upon a scale screen 18. The enlarged image on the scale screen 18 is viewed from a point, indicated at 19, which is suitably shielded so that external light can not strike the screen. The optical projection system including the adjustable stage apparatus for focusing the image of the article being measured have not been illustrated nor described in detail, since such systems and apparatus are well known in the art and are not believed necessary to a full understanding of this invention.

The conductor 14, an image of the end cross-sectional area 14 of which is to be projected onto the scale screen 18, is supported on a suitable type of adjustable stage fragmentary shown at 20 (Figs. 3 and 4) in the form of a bar whereby the conductor area 14 may be shifted to obtain a clear and accurate image thereof on the scale screen 18. Fixed to the bar 20 is an L-shaped member 21 to a horizontal arm of which is attached a plate 22. Formed in the horizontal arm of the member 21 and plate 22 is a vertically directed circular aperture 25 (Fig. 1), the peripheral surface of which is tapered. For directly supporting and rotating the sample length of conductor 15 on the stage there is provided a generally circular sleeve-like rotatably mounted member 26 having a peripherally knurled hand grip or head 27 and a slot 28 which extends longitudinally throughout the length of the member. The slot 28, as clearly shown in Figs. 3 and 4, is of such dimensions and arrangement relative to the cross-sectional dimensions of the conductor 15 that when the latter is entered and correctly positioned in the slot the longitudinal axes of the member 26 and the conductor will coincide. The dimension of the slot 28 between opposed slot walls 29 (Figs. 3 and 4) is such that the conductor 15 may be entered in the slot with opposed semi-circular peripheral walls of the conductor freely abutting the slot walls and without deforming the easily compressible outer rubber covering of the conductor.

When correctly positioned in the slot 28 one side of the conductor 15 abuts a wall 32 of the slot which interconnects the slot walls 29 and is held thereagainst by means of a leaf spring 33 attached at its upper end by an angular arm 34 thereof to the upper surface of the head 27 of the member 26, the depending portion of the leaf spring extending along the slot 28 and freely fitting between the opposed walls 29 of the slot. At its lower end the leaf spring 33 engages the conductor 15 at a point adjacent the end area 14 thereof. The extreme end of the leaf spring is turned outwardly to facilitate the insertion of the length of conductor 15 into the slot 28 of the member 26, the conductor being inserted into the upper end of the member. For a comparatively short distance from its lower end the member 26 is counterbored, as indicated at 35, so that the lower end portion of the conductor 15, extending along the counterbore, is not confined at any point around its peripheral surface and thus the conductor is permitted to assume its natural configuration during measurement.

The periphery of the member 26 at a suitable distance below the head 27 is circularly tapered at 36 (Fig. 1) to accurately fit the tapered peripheral circular surface of the aperture 25 in the member 21 and plate 22, the two tapered peripheral surfaces cooperating to definitely position and rotatably support the member 26 with the sample length of conductor 15 upon the adjustable stage, indicated fragmentarily by the bar 20. A reduced lower end of the member 26 is freely insertable, from above the plate 22, into the aperture 25 and the tapered surface of the member 26 comes to rest upon the tapered surface of the aperture. To remove the member 26 from the apparatus, it is merely withdrawn in an upward direction.

Inscribed or otherwise indicated on the screen 18 is a scale comprising a combination of right angularly arranged lines 40 showing the desired boundaries of the overall dimensions of the cross-sectional area 14 of the insulated conductor 15, the diameters of the opposed semi-circular conductor portions, the axes of the conducting wires 16 and the concentricity of the semi-circular portions relative to the conducting wires embedded in the rubber cover.

In practicing the method of measuring cross-sectional areas of conductors by means of the above described apparatus a sample length of conductor 15 is first cut by an operator from a supply shortly after it emerges from an extruding machine which is used in the manufacture of the rubber covered conductor. In cutting the conductor the cross-sectional end area thereof is distorted due to the rubber covering being easily compressed. The end of the conductor which has been distorted is then placed against a grinding wheel with a light pressure to remove the distorted portion and form an end surface 14 perpendicular to the axis of the conductor. In this operation the conducting wires may have slight burrs formed thereon which may be removed with a burring tool without disturbing the position and relationship of the wires with respect to each other and with respect to the insulation.

Thereafter the length of conductor 15 with the normal cross-sectional end area 14 pointed downwardly is inserted in the slot 28 of the supporting member 26 which has been removed from the projection apparatus and while the member is vertically disposed with its lower end surface abutting a flat table, plate or other flat surface, the conductor is moved downwardly until it engages the flat table surface and is held in this position in the member 26 by the action of the leaf spring 33. The ground end area 14 of the conductor is now flush with the lower end surface of the member and thus is in correct focus if the apparatus has been previously properly adjusted when the member 26 is placed in the tapered aperture 25 of the member 21 and plate 22 carried by the adjustable stage bar 20 of the optical projection system. The magnified image of the conductor end area 14 is thus projected upon the scale screen 18 through the lenses 17 in the manner previously described. If the apparatus is not correctly focused, the operator may focus the image upon the screen 18 by adjusting the stage 20, whereupon he rotates the conductor carried upon the rotatable supporting member 26 by means of the hand grip 27 to bring the image into alignment with the scale upon the screen and thus may readily compare the magnified image of the end area 14 of the conductor relative to the scale lines 40 on the screen and note whether the contour and various dimensions of the end area 14 of the conductor are within tolerable limits.

Although the invention as herein illustrated and described is particularly well adapted for use in connection with measuring the overall dimensions, diameter and concentricity of easily compressible rubber covered multi-electrical conductors of the oval cross-sectional type, it should be understood that the novel features thereof are capable of being applied to the measuring of other articles and should be limited only by the scope of the appended claims.

What is claimed is:

1. In an apparatus for measuring the dimensions of a cross-sectional area of an article, an optical projection system including means for producing a beam of light and projecting an enlarged image of said area, means for holding and predeterminedly positioning the article in the system, said means including a sleeve-like member provided with a slot extending longitudinally throughout its length for receiving the article and positioning said area flush with an end surface of the member, and a yieldable element carried by said member arranged to engage a portion of the article adjacent said area thereof for retaining the article within said slot and against a surface of said member, and a screen having a scale upon which the enlarged image of said area is projected for comparison with the scale.

2. In an apparatus for measuring the diameter and/or concentricity of an insulated conductor, an optical projection system including means for producing a beam of light and an enlarged image of an end area of the insulated conductor, means for holding and predeterminedly positioning the end area of a length of conductor in the system, said means including an apertured support, a rotatable sleevelike member freely insertable in and removable from the aperture of said support, said aperture and member having tapered coacting walls effective to rotatably position the member in the support, said member provided with a slot extending longitudinally throughout its length for receiving the conductor and positioning said end area thereof flush with an end surface of the member, and a leaf spring carried by said member and extending into the slot of the member and engaging a peripheral surface of the conductor adjacent said end area for retaining the conductor within said slot and against a surface of said member, and a screen having a scale upon which the enlarged image of said end area is projected for comparison with the scale.

3. In an apparatus for measuring the dimensions of a cross-sectional area of an article, an optical projection system including means for producing a beam of light to illuminate the cross-sectional area of an article, means to project an enlarged image of said area of the article, means including a yieldable element engaging the article for supporting the article with said area thereof flush with an end surface of said means, means for predeterminedly positioning said end surface of said means in projecting position in the system, and a screen having a scale upon which the enlarged image of said article area is projected for comparison with the scale.

4. In an apparatus for measuring the diameter and/or concentricity of an insulated conductor, an optical projection system including means for producing a beam of light to illuminate the end area of an insulated conductor, means to project an enlarged image of an end area of the insulated conductor, a sleeve-like member for receiving a length of conductor, flexible means supported by said sleeve and engaging the conductor for retaining said end area flush with an end surface of the sleeve, means for predeterminedly positioning said surface in projecting position in the system, and a screen having a scale upon which the enlarged image of said area is projected for comparison with the scale.

HAROLD R. LONGFELLOW.